(12) United States Patent
Sugiyama et al.

(10) Patent No.: US 12,263,730 B2
(45) Date of Patent: Apr. 1, 2025

(54) CONTROL VALVE FOR FUEL TANK

(71) Applicants: KYOSAN DENKI CO., LTD., Koga (JP); TOYOTA JIDOSHA KABUSHIKI KAISHA, Toyota (JP)

(72) Inventors: Akinari Sugiyama, Koga (JP); Takashi Fukumitsu, Toyota (JP); Makoto Iwase, Toyota (JP); Hidekazu Fukuoka, Toyota (JP)

(73) Assignees: KYOSAN DENKI CO., LTD., Koga (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 18/273,601

(22) PCT Filed: Dec. 24, 2021

(86) PCT No.: PCT/JP2021/048360
§ 371 (c)(1),
(2) Date: Jul. 21, 2023

(87) PCT Pub. No.: WO2022/158259
PCT Pub. Date: Jul. 28, 2022

(65) Prior Publication Data
US 2024/0075807 A1    Mar. 7, 2024

(30) Foreign Application Priority Data

Jan. 21, 2021 (JP) .................. 2021-007917

(51) Int. Cl.
*B60K 15/035* (2006.01)
*F16K 31/18* (2006.01)

(52) U.S. Cl.
CPC ...... *B60K 15/03519* (2013.01); *B60K 2015/0358* (2013.01); *F16K 31/18* (2013.01)

(58) Field of Classification Search
CPC ............ B60K 15/03519; B60K 15/035; B60K 2015/0358; F16K 31/18; F16K 31/22; F16K 24/044; F02M 37/00
See application file for complete search history.

(56) References Cited

U.S. PATENT DOCUMENTS 6,035,884 A * 3/2000 King ............... B60K 15/03519
137/202
6,513,541 B1 * 2/2003 Herlihy ................ F16K 24/042
137/430

(Continued)

FOREIGN PATENT DOCUMENTS

JP    2013-82427 A    5/2013
JP    2019-124202 A   7/2019

*Primary Examiner* — Patrick C Williams
(74) *Attorney, Agent, or Firm* — Oliff PLC

(57) ABSTRACT

A fuel-tank control valve includes: casing; main float; plate with upper surface that constitutes bottom portion of casing, and that includes first gas-storage chamber formed of plate and peripheral wall portion that is provided upright from rim of upper surface to lower side; sub float arranged above the plate; second gas-storage chamber formed of a part including gas supply hole of first gas-storage chamber among parts of upper surface, and partition-wall portion which is away from peripheral wall portion, and that is provided in first gas-storage chamber; and clearance which is formed between casing and peripheral wall portion, and through which fuel in fuel tank can flow in, second gas-storage chamber and clearance being provided for sub float. Upper surface includes protruding seating portion that forms inflow space through which gas through gas supply hole can flow in under state in which sub float is seated on protruding seating portion.

17 Claims, 11 Drawing Sheets

(56) References Cited

U.S. PATENT DOCUMENTS

| | | | | |
|---|---|---|---|---|
| 6,848,463 B2* | 2/2005 | Johansen | ............. | F16K 24/044 |
| | | | | 137/202 |
| 7,168,441 B2* | 1/2007 | Miyoshi | ............... | F16K 24/044 |
| | | | | 137/411 |
| 7,418,975 B2* | 9/2008 | Nojiri | ................. | F16K 24/044 |
| | | | | 137/202 |
| 8,186,372 B2* | 5/2012 | Horiba | .................. | F16K 25/00 |
| | | | | 137/202 |
| 8,689,821 B2* | 4/2014 | Miller | .................. | F16K 24/044 |
| | | | | 137/430 |
| 2001/0011538 A1* | 8/2001 | Crary | ................. | F02M 37/103 |
| | | | | 137/202 |
| 2013/0075394 A1 | 3/2013 | Suzuki | | |
| 2020/0331341 A1 | 10/2020 | Sugiyama et al. | | |

* cited by examiner

CONTROL VALVE FOR FUEL TANK

TECHNICAL FIELD

The present disclosure relates to a fuel-tank control valve to be installed in a fuel tank for automobiles.

BACKGROUND ART

The fuel tank for automobiles includes the fuel-tank control valve for purposes of, for example, preventing fuel spill in cases of wobbling, overturning, supplying fuel, and the like, restricting a liquid level at a time of filling up, venting fuel vapor (evaporative gas), controlling an increase of pressure in the fuel tank, and preventing excess fuel supply.

The fuel-tank control valve includes a casing that is fitted to an inside of the fuel tank, and a float that is installed in the casing and that has buoyancy against the fuel (which may be a single float, or may include a main float and a sub float). For example, when the fuel-tank control valve includes the two floats, an upper portion of the casing is connected to a ventilation path that establishes communication between the fuel tank and a canister which adsorbs the evaporative gas to be generated in the fuel tank. Once the main float closes, this closed state is maintained for a relatively long time period. In the casing, the sub float installed below the main float closes by floating on the fuel when a vehicle turns or when first fuel supply is automatically stopped. When the first fuel supply is finished, gas that has floated up the sub float in the closed state is released, and the sub float enters an open state (refer, for example, to Patent Literature 1).

The fuel-tank control valve, which is configured as described above, is capable of allowing the fuel supply even when, for example, the vehicle in which the fuel tank is installed turns immediately before the fuel supply to cause a liquid surface in the fuel tank to significantly wobble, and capable of preventing the fuel from overflowing through a fuel-filler port at the time of the first fuel supply. In other words, the fuel-tank control valve has a structure that satisfactorily follow dynamic changes of the liquid surface of the fuel.

Incidentally, the sub float may be moved in conjunction with the liquid surface of the fuel, or may be moved in conjunction with flow of the gas. For example, in order that the first automatic stop is performed, the sub float may close a fuel path in conjunction with the liquid surface of the fuel, or may be moved in conjunction with flow of the evaporative gas. At this time, when a vapor treatment apparatus repeats introduction and a purge of negative pressure (engine purge), the negative pressure fluctuates in a pulsating manner and influences the sub float to move up and down in conjunction therewith and to collide against other members. Further, noise of the collision successively occurs, and hence there is a risk that a driver misunderstand this collision noise as a failure of the vehicle, or the driver is distracted from driving operations. Still further, there is a risk that the repetitive collisions cause damage to collision parts.

In view of such circumstances, in the related art, there is disclosed another fuel-tank control valve including
the sub float,
a volume chamber
that is provided between the sub float and a plate on which the sub float is seated in an open state, and
that varies in volume in conjunction with up-and-down movements of the sub float, and
a flow-rate adjustment mechanism having
a through-hole through which gas is supplied from the plate to the volume chamber, and
a control gap (clearance) that allows fuel to flow into the volume chamber, the clearance causing the volume chamber to function as a damper (refer, for example, to Patent Literature 2).

In this configuration, the clearance forms such a narrow gap as to limit flow of the fuel, and controls the inflow of the fuel to the volume chamber and outflow of the fuel from the volume chamber. In this way, the sub float has a damper structure that delays a movement of the sub float from the closed state to the open state by limiting discharge of the fuel from the volume chamber with use of a phase difference between changes of the liquid surface in the fuel tank and movements of the sub float, the phase difference being caused by the clearance. With this, the sub float is suppressed from being sensitively opened and closed, and the collision noise is suppressed.

CITATION LIST

Patent Literature

[PTL 1] JP 2013-82427 A
[PTL 2] JP 2019-124202 A

SUMMARY OF THE INVENTION

Technical Problem

However, in a case where the liquid surface of the fuel is significantly wobbled, for example, by the turn of the vehicle, that is, in a case where the liquid surface of the fuel is dynamically displaced, the damper structure hinders the sub float from reacting timely. Thus, inconvenience that the fuel-tank control valve does not exert predetermined functions may occur.

FIG. 13 is a schematic view of a sub float 301 and a plate 401 of a related-art fuel-tank control valve. A of FIG. 13 illustrates a state in which fuel F in a fuel tank has been wobbled, for example, by the turn of the vehicle, and has entered a gas storage chamber 405 of the plate 401. For example, at a time of fuel supply, unlike the state illustrated in A of FIG. 13, the liquid surface horizontally rises to push up gas in the gas storage chamber 405, and the gas is supplied to a side where the sub float 301 is present through a gas supply hole 403. The supplied gas causes the sub float 301 to act to float up relative to the liquid surface and to be closed.

However, in the case where the fuel F is wobbled, for example, by the turn, the fuel F precipitously flows into the gas storage chamber 405. Then, before the sub float 301 floats up, a part of a liquid surface F1 rises past the sub float 301 up to a position on a side where a main float (not shown) is present through a through-hole 302. In addition, the fuel F enters the side where the main float is present also through a clearance 404 or other fuel inflow paths (not shown). In this case, a residual gas R in the gas storage chamber 405 is expelled by the inflow of the fuel F, and hence is significantly reduced in amount. Then, as illustrated in A of FIG. 13, in a case where the residual gas R is no longer present near the gas supply hole 403, the gas cannot be supplied to the side where the sub float 301 is present. Thus, the sub float 301 cannot gain buoyancy, and hence cannot be closed.

Note that, as described above, in a case where the sub float 301 cannot be closed, the sub float 301 remains seated on a seating portion 402 on a side where the plate 401 is present. As illustrated in B of FIG. 13, an upper surface of the seating portion 402 is formed of a flat surface that comes into surface contact with the sub float 301 except the gas supply hole 403 opened at a center. Thus, when the sub float 301 is seated on the seating portion 402, the sub float 301 and the seating portion 402 enter a state of the surface contact except the gas supply hole 403. Then, as described above, as long as the state of the surface contact continues with the amount of the residual gas R small, the gas is not supplied to the side where the sub float 301 is present. As a result, resistance of the damper increases to deteriorate reactivity of the sub float 301. In particular, when the sub float 301 is seated, and a surface of the sub float 301 and the surface of the seating portion 402 come into the surface contact with each other with the fuel adhering to these surfaces, both these surfaces attract each other by surface tension. Thus, even when the gas is supplied to the side where the sub float 301 is present, it takes time for the sub float 301 to be unseated. As a result, there is a risk that the reactivity of the sub float 301 is deteriorated.

As described above, when the damper structure is provided as a precaution against the collision noise, the reactivity of the sub float is deteriorated in the case where the liquid surface of the fuel is dynamically displaced, and an effect of closing the sub float is deteriorated. As a result, there is a risk that a liquid surface on an outside of the fuel-tank control valve (inside of the fuel tank) and the liquid surface on the inside of the fuel-tank control valve are abruptly leveled with each other.

Further, in the case where the main float is held in the closed state by reacting to the successive turns of the vehicle in which the fuel tank is installed, the evaporative gas to be generated in the fuel tank cannot be discharged to the canister, and fills the fuel tank to cause an increase of internal pressure. This poses a risk of not only deformation but also even explosion of the fuel tank.

Still further, in a case where the main float is in the closed state immediately after the turn, the fuel-tank control valve operates as in a filled-up state. Thus, inconvenience that fuel cannot be supplied despite a state where the fuel tank has not been filled up may occur.

Meanwhile, before the main float reacts to the successive turns of the vehicle in which the fuel tank is installed (that is, before the main float closes), the fuel may flow out into the ventilation path connected to the upper portion of the casing, and reach the canister. In this case, if the fuel precipitously reaches the canister, an excess over an allowable adsorbing amount may occur to cause rapid deterioration of performance of the canister.

Although the above-described damper structure solves the problem of the collision noise, this structure may cause the deterioration of the reactivity of the sub float in the case where the liquid surface of the fuel is dynamically displaced. In other words, a trade-off relationship exists between the above-described damper structure and the above-described displacement-following structure. Note that, as in the above description of the problems with the fuel-tank control valve including the two floats, that is, the main float and the sub float with reference to FIG. 13, as long as the damper structure is provided, a fuel-tank control valve including the single float also has the problem that the reactivity to the dynamic displacement of the liquid surface of the fuel is deteriorated.

In view of such circumstances, the present disclosure has been made to solve the problems as described above, and an object thereof is to provide a fuel-tank control valve that reduces the collision noise and increases the reactivity to dynamic displacement of a liquid surface of fuel.

Solution to Problem

In order to achieve the above-described object, according to an aspect of the present disclosure, there is provided a fuel-tank control valve including:
 a casing
  that is installed in a fuel tank for a vehicle, and
  that includes an upper portion connected to a ventilation path which communicates with the fuel tank;
 a valve seat portion that is provided in the casing;
 a plate that is arranged to face the valve seat portion on a side where a lower portion of the casing is present relative to the valve seat portion;
 a peripheral wall portion that is provided upright from a rim of the plate to the side where the lower portion of the casing is present;
 a first gas-storage chamber that is formed of the plate and the peripheral wall portion;
 a gas supply hole
  that is opened through a surface which faces the valve seat portion among surfaces of the plate, and
  that allows gas to be supplied from the first gas-storage chamber into a volume-variable space which is formed between the plate and the valve seat portion;
 a clearance
  which is formed between the casing and the peripheral wall portion, and
  through which fuel in the fuel tank can flow in;
 a float
  that has buoyancy against the fuel which flows in through the clearance, and
  that is provided to be capable of being seated on the valve seat portion by floating up in the volume-variable space by replenishment of the gas to be supplied through the gas supply hole;
 a through-hole
  that is opened through the float,
  that causes the fuel to be suppressed from flowing in through the clearance under a state in which the float is seated on the valve seat portion, and
  that allows the gas which has been supplied in the volume-variable space to be discharged to a side where the upper portion is present relative to the valve seat portion as the buoyancy decreases; and
 a second gas-storage chamber
  that is formed of
   a part including the gas supply hole among parts of the plate, and
   a partition-wall portion which is provided upright parallel to and away from the peripheral wall portion, and
  that is provided in the first gas-storage chamber,
 the fuel-tank control valve controlling opening and closing of a fuel flow path in the casing by causing the float to be seated on and unseated from the valve seat portion.

In this structure, the second gas-storage chamber is formed while the clearance to be a damper structure is secured. With this, even when a liquid surface of the fuel is dynamically displaced, gas immediately under the gas supply hole can remain, and this gas can be supplied to the float. Thus, the float can be closed following the displacement of the liquid surface of the fuel.

According to another aspect of the present disclosure, there is provided a fuel-tank control valve in which an upper surface of the plate includes a protruding seating portion that forms an inflow space through which the gas through the gas supply hole can flow in under a state in which the float is seated on the protruding seating portion.

In this structure, the inflow space is formed. With this, when the gas is supplied from the second gas-storage chamber to a side where the float is present through the gas supply hole, the gas for floating up the float can be promptly supplied even under the state in which the float is seated on the plate. In addition, a contact area between the float and the plate is reduced by the formation of the inflow space. Thus, surface tension to be caused by surface contact between the float and the protruding seating portion can be reduced.

Further, according to a still another aspect of the present disclosure, there is provided a fuel-tank control valve
in which the second gas-storage chamber is formed of
a part including the gas supply hole among parts of the upper surface, and
the partition-wall portion which is away from the peripheral wall portion,
in which the clearance is formed between the casing and the peripheral wall portion, and
in which the upper surface of the plate includes the protruding seating portion that forms the inflow space through which the gas through the gas supply hole can flow in under the state in which the float is seated on the protruding seating portion.

In this configuration, the second gas-storage chamber is provided in the first gas-storage chamber, and the protruding seating portion having the inflow space is provided. With this, the inflow space is formed between the float and the protruding seating portion, which causes the gas from the second gas-storage chamber to the side where the float is present to be supplied to the float. Thus, effect of closing the float can be caused with good reactivity even in a case where the liquid surface of the fuel is dynamically displaced.

Advantageous Effects of the Invention

The fuel-tank control valves disclosed herein provide an advantage that the collision noise can be reduced and that the reactivity to the dynamic displacement of a liquid surface of fuel can be increased.

Figure 5A:
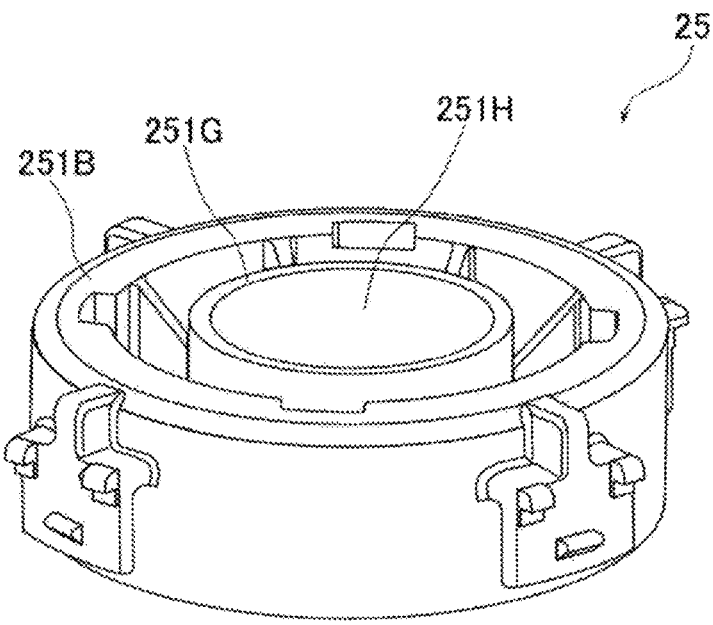
Figure 5B:
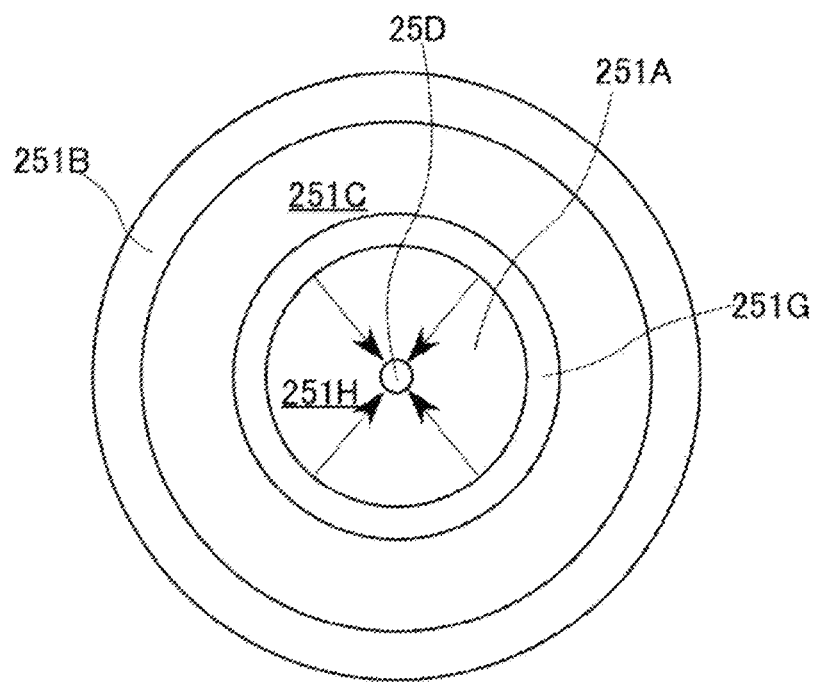

A of FIG. 5 is a bottom perspective view of the plate according to a first modification of the first embodiment.

B of FIG. 5 is a schematic bottom view of the plate according to the first modification of the first embodiment.

Figure 6:
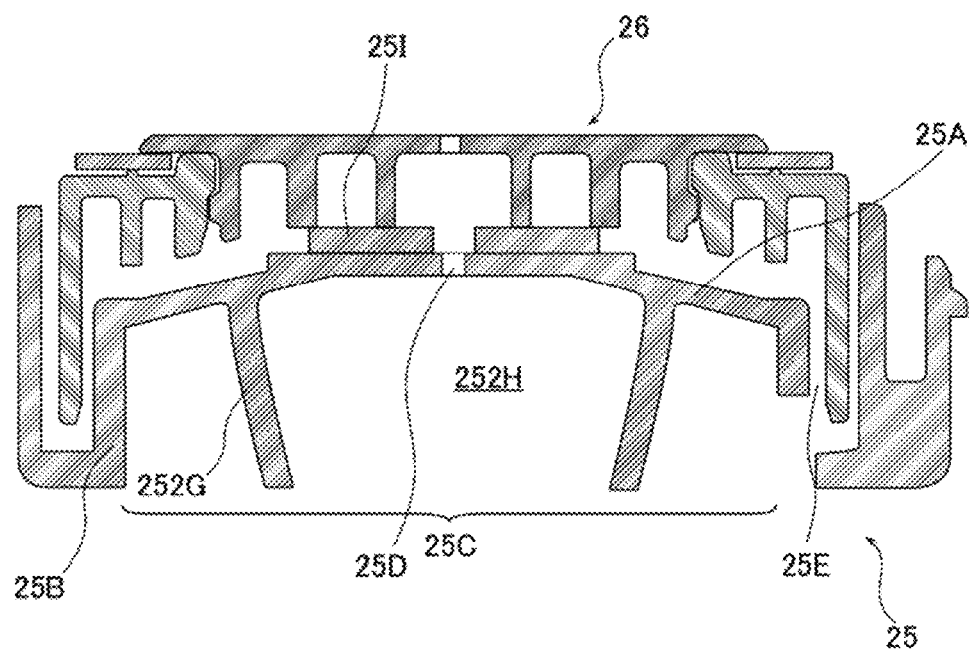

FIG. 6 is a view illustrating a second modification of the first embodiment.

Figure 7:
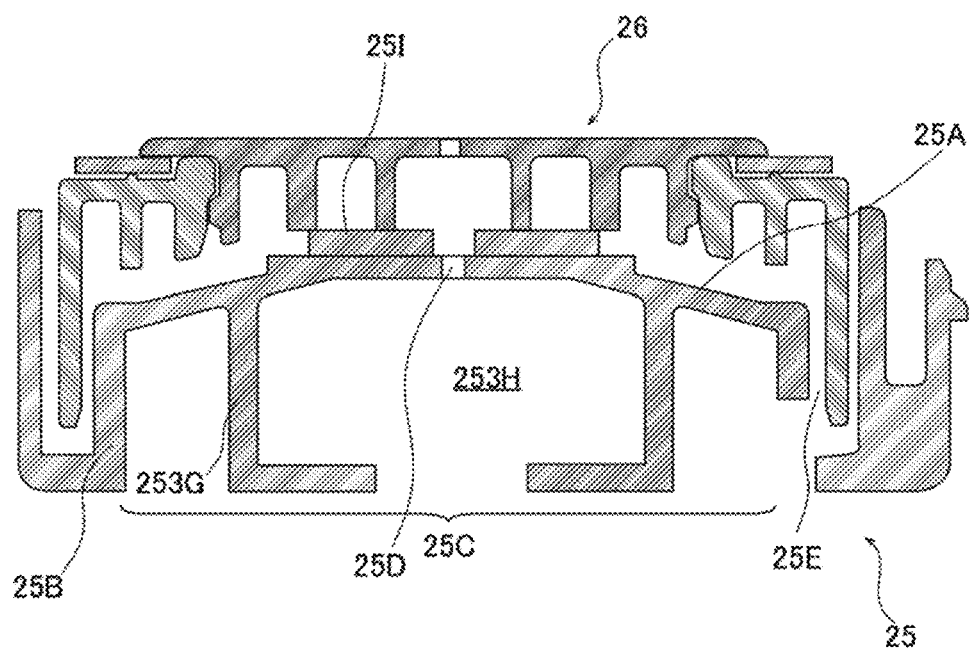

FIG. 7 is a view illustrating a third modification of the first embodiment.

Figure 8:
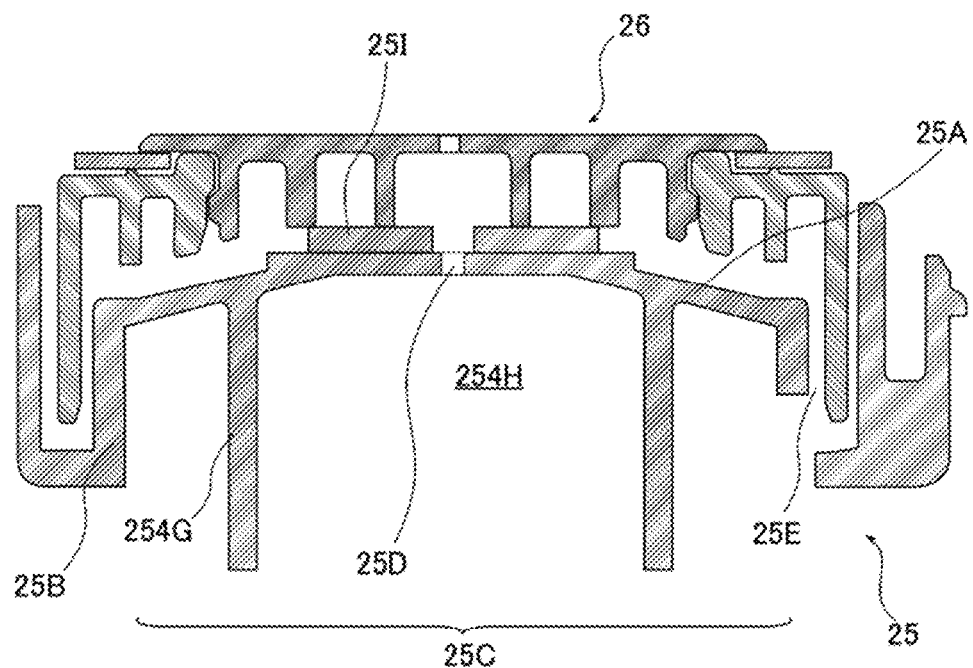

FIG. 8 is a view illustrating a fourth modification of the first embodiment.

Figure 9:
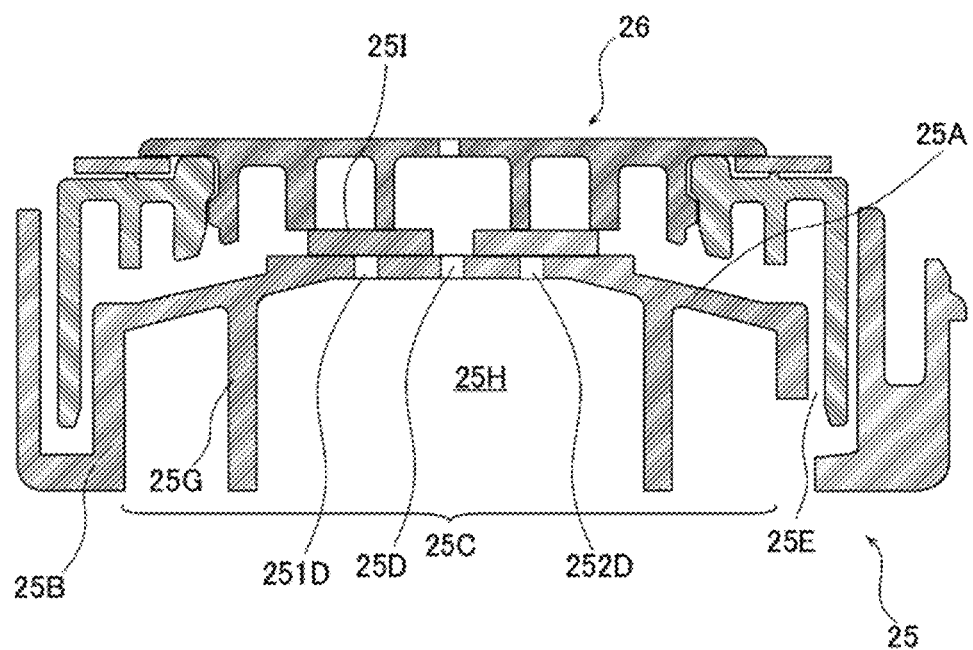

FIG. 9 is a view illustrating a fifth modification of the first embodiment.

Figure 10A:
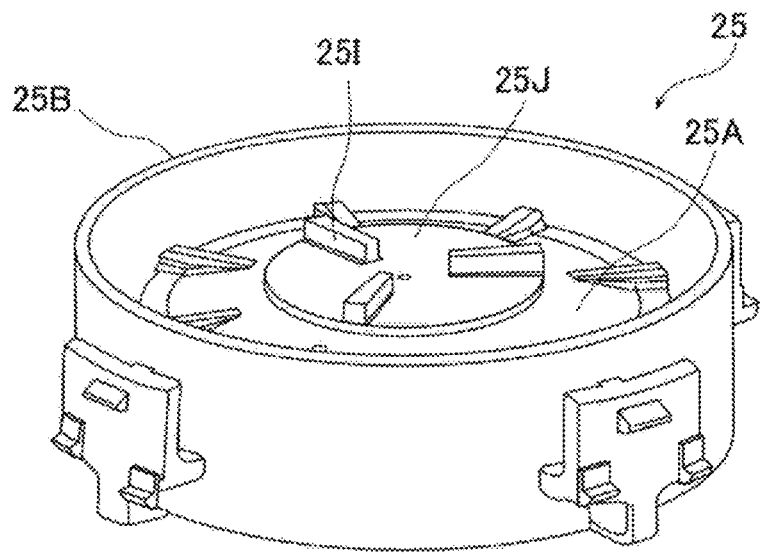

FIG. 10A is a top perspective view of a plate according to a second embodiment.

Figure 10B:
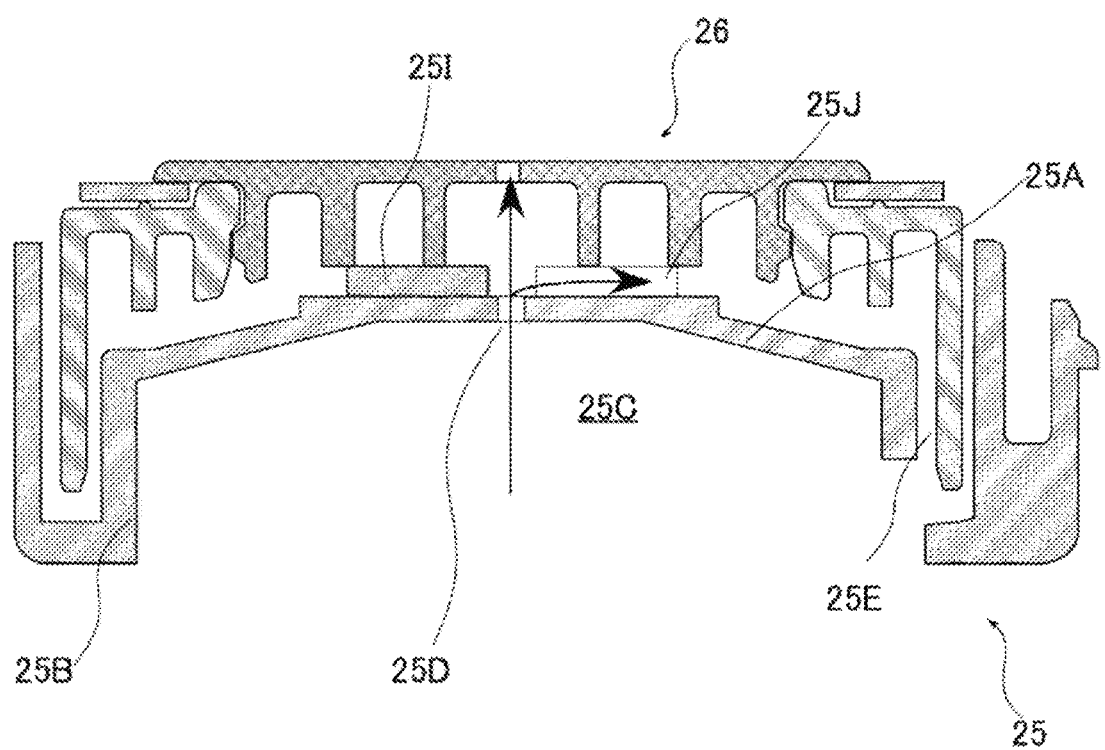

FIG. 10B is a cross-sectional side view of the plate and the sub float according to the second embodiment.

Figure 11A:
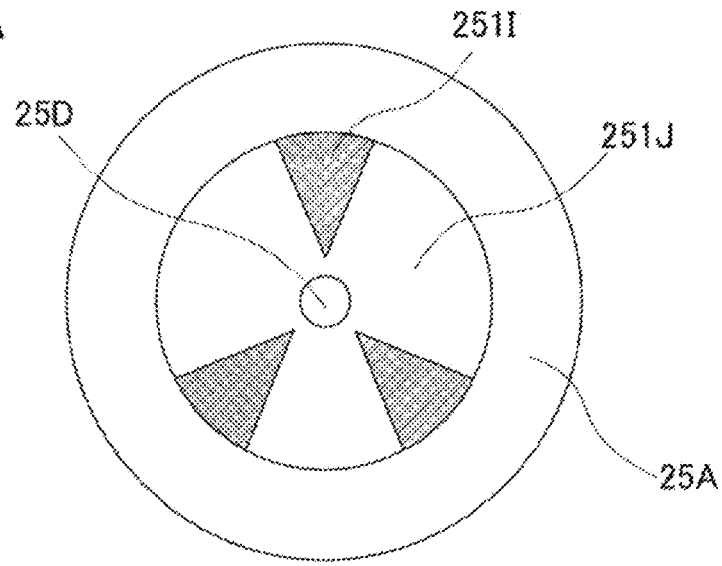

FIG. 11A is a schematic top view illustrating a first modification of protruding seating portions formed on an upper surface of the plate.

Figure 11B:
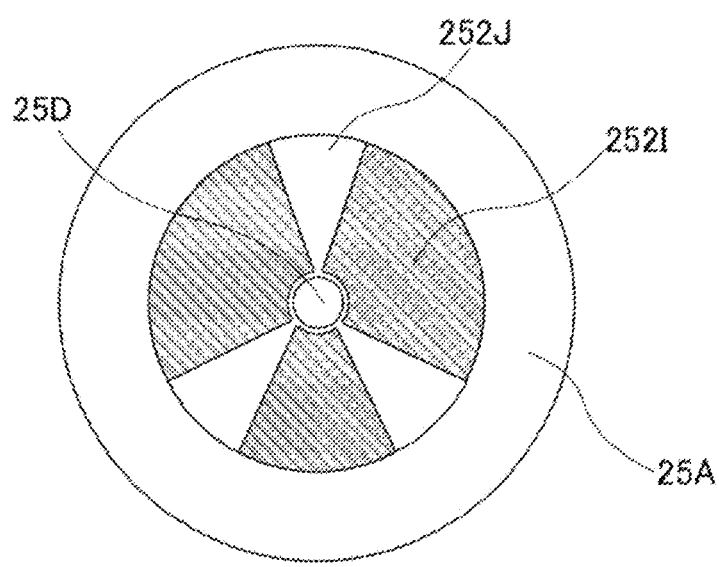

FIG. 11B is a schematic top view illustrating a second modification of the protruding seating portions formed on the upper surface of the plate.

Figure 11C:
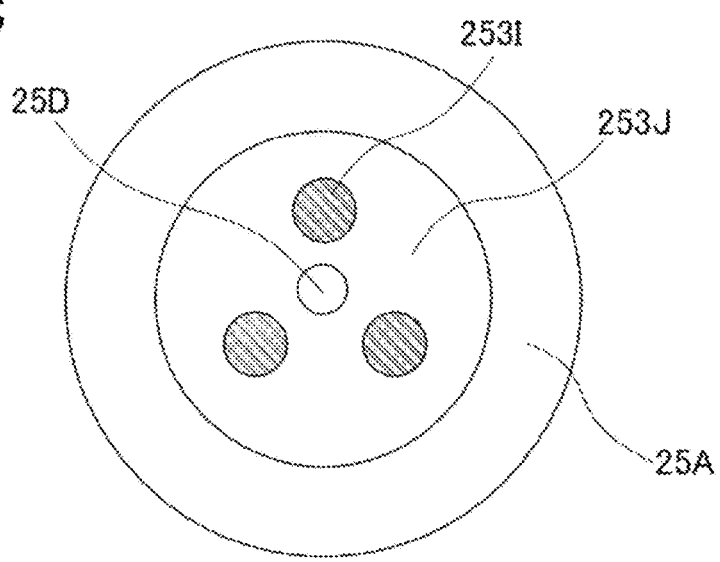

FIG. 11C is a schematic top view illustrating a third modification of the protruding seating portions formed on the upper surface of the plate.

Figure 12:
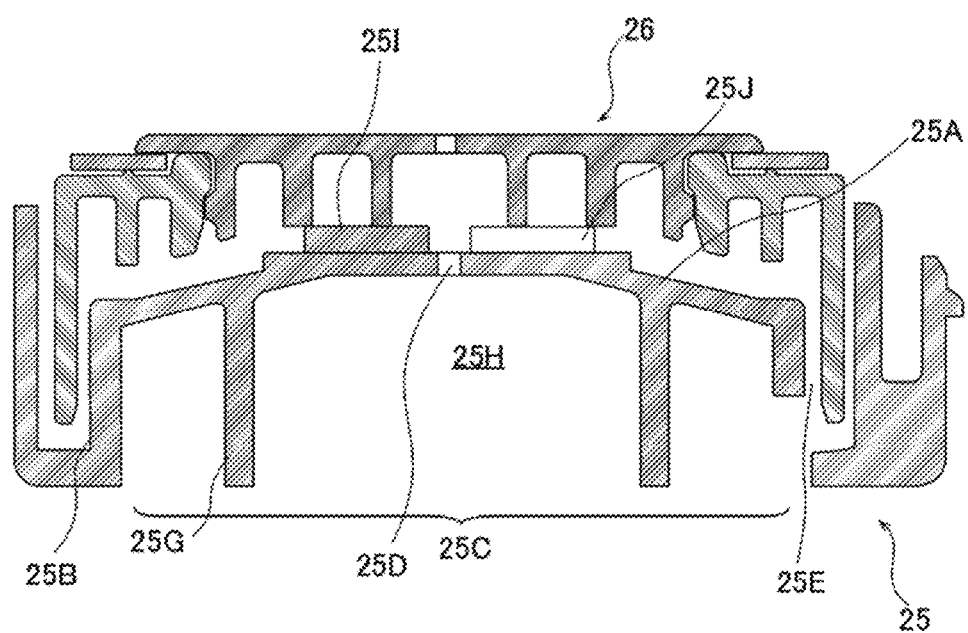

FIG. 12 is a schematic cross-sectional side view of the plate and the sub float according to a third embodiment.

Figure 13A:
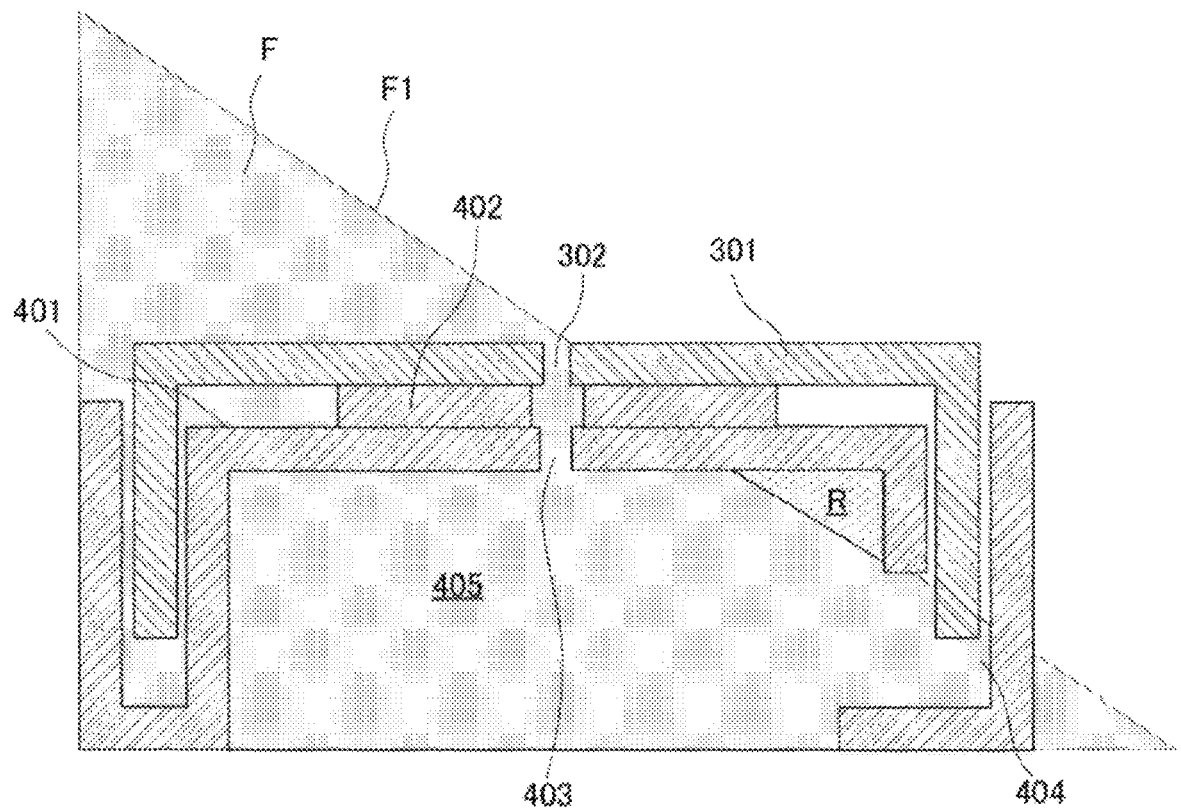

FIG. 13A is a cross-sectional side view illustrating a state in which, in a related-art fuel-tank control valve, fuel has entered a sub float and a plate in a case of wobbling.

Figure 13B:
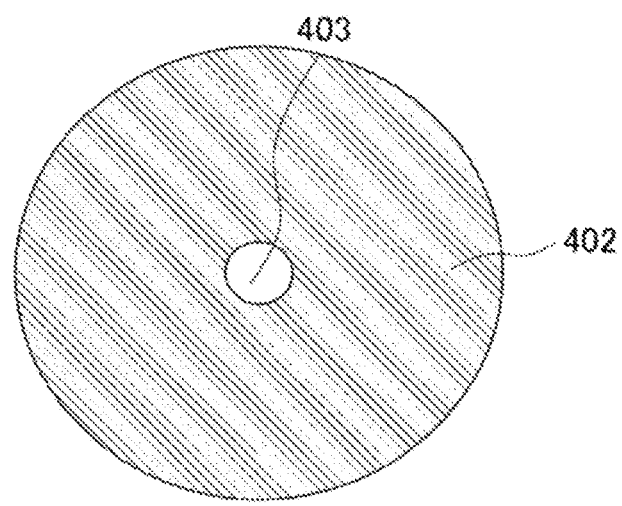

FIG. 13B is a top view of a seating portion of the related-art fuel-tank control valve.

DESCRIPTION OF EMBODIMENTS

Hereinbelow, embodiments for carrying out the present disclosure are described with reference to the drawings. When components corresponding to those in foregoing ones of the embodiments are described in subsequent ones of the embodiments, these components are denoted by the same reference symbols to omit redundant description. In addition, when only a part of a configuration is described in each of the embodiments, other parts of the configuration may be described using reference symbols in the foregoing ones of the embodiments. Even when possibilities of making specific combinations are not explicitly described in the embodiments, as long as there are no particular problems in making these combinations, the embodiments may be partially combined with each other. In addition, members in the drawings are enlarged as appropriate for the sake of simplicity of description, and are not illustrated in actual dimensions and proportions. Other applicable fields will become apparent from the description of the specification. Description of this outline and specific examples are merely intended to illustrate examples, and are not intended to limit the scope of the present disclosure.

<Fuel Tank>

Figure 1:
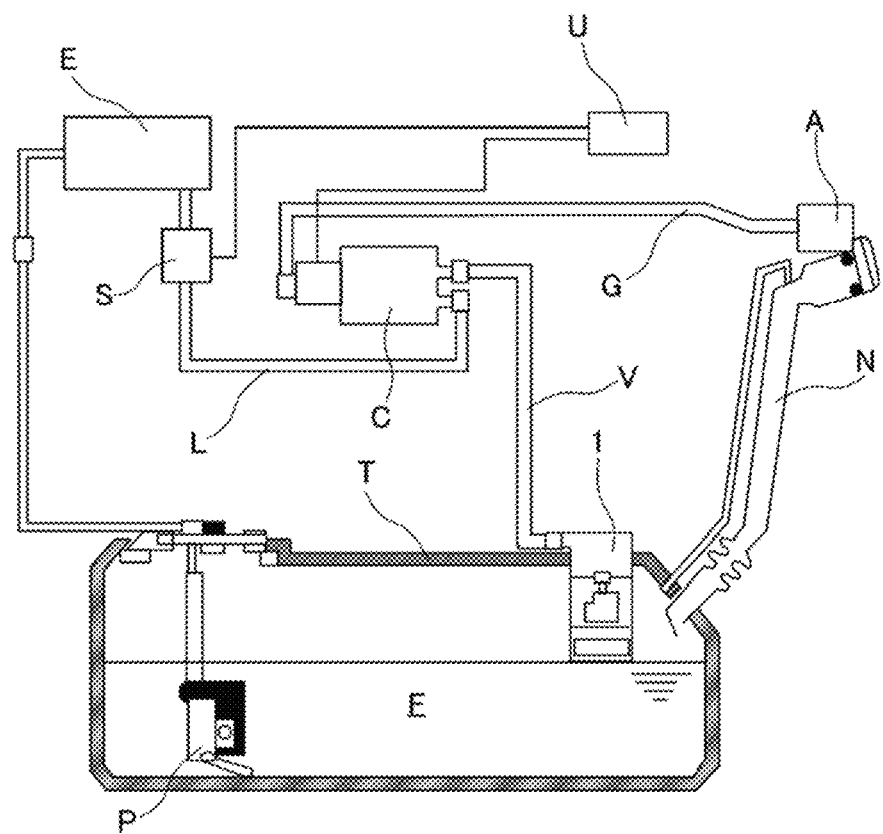
FIG. 1 is a schematic cross-sectional side view of a fuel tank.

FIG. 1 is a schematic cross-sectional side view of a fuel tank T to which a fuel-tank control valve 1 is fitted. A pump unit P is installed in the fuel tank T, and the fuel F in the fuel tank T is supplied to an engine system E by the pump unit P.

The fuel F is supplied from a fuel-filler nozzle N to the fuel tank T through a fuel-filler port. In addition, evaporative gas generated from the fuel F in the fuel tank T is fed from the fuel-tank control valve 1 to a canister C through a ventilation path V.

The evaporative gas introduced in the canister C is temporarily adsorbed by an adsorbent in the canister C. Then, if a predetermined driving condition is satisfied, fuel components are supplied to the engine system E through a purge line L. The fuel components are supplied from the canister C to the engine system E at a flow rate that is adjusted by a vacuum switching valve S controlled by an electronic control unit U. Above the fuel-filter nozzle N, an air filter A and an atmosphere line G connected to the air filter A are equipped.

<Outline of Configuration of Fuel-Tank Control Valve>

Figure 2:
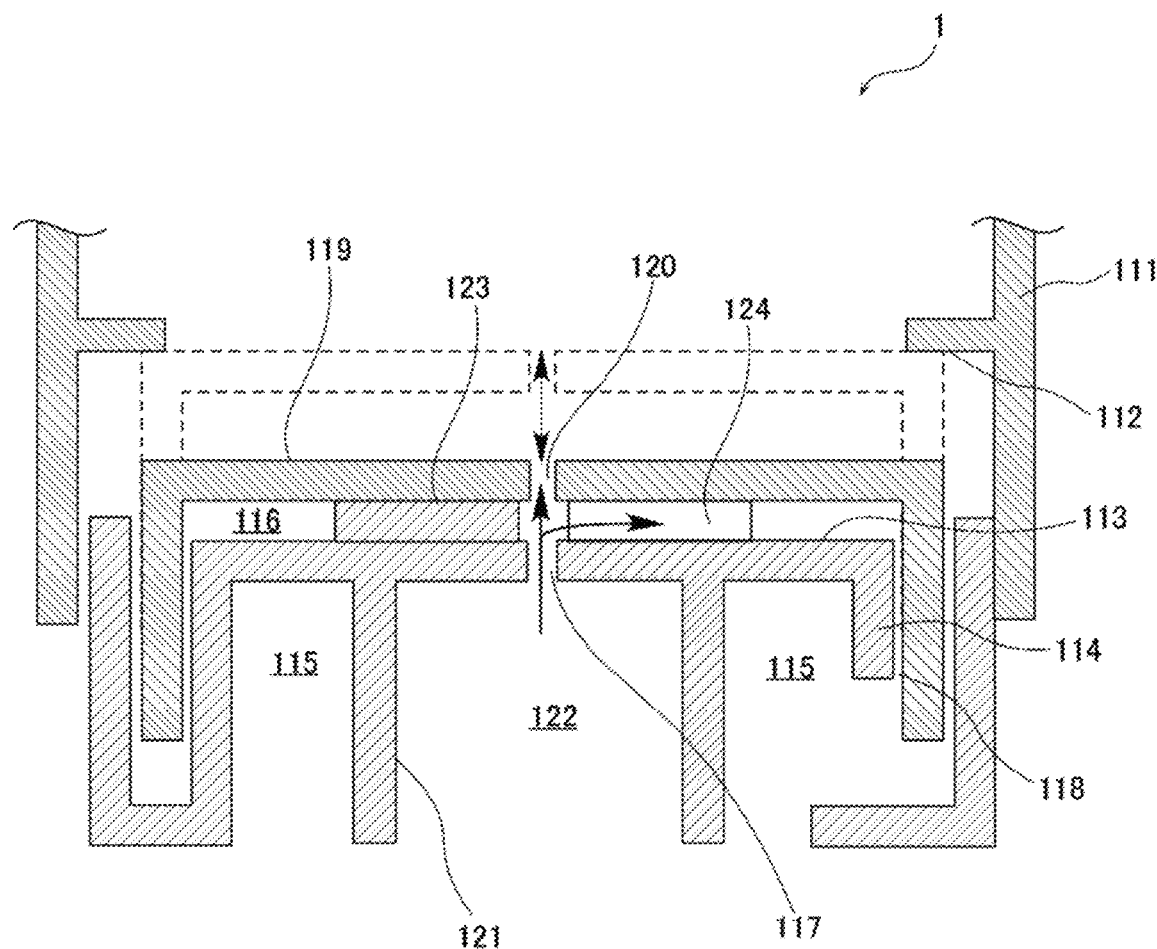
FIG. 2 is a schematic cross-sectional side view of an outline of a configuration of a fuel-tank control valve.

FIG. 2 is an outline view (cross-sectional side view) of a configuration of the fuel-tank control valve 1 disclosed herein, the fuel-tank control valve 1 including a single float. The fuel-tank control valve 1 includes a casing 111, a valve seat portion 112, a plate 113, and a float 119.

The casing 111 is installed in the fuel tank T, and an upper portion of the casing 111 is connected to the ventilation path V that communicates with the fuel tank T (not shown).

The valve seat portion 112 is provided in the casing 111. The plate 113 is arranged to face the valve seat portion 112 on a side where a lower portion of the casing 111 is present relative to the valve seat portion 112.

The plate 113 includes a peripheral wall portion 114 that is provided upright from a rim of the plate 113 to the side where the lower portion of the casing 111 is present. The plate 113 and the peripheral wall portion 114, which are molded integrally with each other in the embodiments, may be separate from and joined to each other. The plate 113 and the peripheral wall portion 114 form a first gas-storage chamber 115.

A gas supply hole 117 is opened through a surface that faces the valve seat portion 112 among surfaces of the plate 113. The gas supply hole 117 allows the gas to be supplied from the first gas-storage chamber 115 to a volume-variable space 116 that is formed between the plate 113 and the valve seat portion 112.

A clearance 118 is formed between the float 119 and the peripheral wall portion 114. As described below, the clearance 118 is a flow-rate control mechanism through which the fuel F in the fuel tank T can flow in.

The float 119 generates buoyancy in conjunction with rise of a liquid surface of the fuel F in the casing 111, and is provided to be capable of being seated on the valve seat portion 112 by floating up in the volume-variable space 116 by replenishment of the gas to be supplied to the volume-variable space 116 through the gas supply hole 117. A through-hole 120 is opened through the float 119. The float 119 allows, through its through-hole 120, the gas that has been supplied in the volume-variable space 116 to be discharged to a side where the upper portion is present relative to the valve seat portion 112. The float 119 is provided to be capable of being unseated from the valve seat portion 112 by losing its buoyancy in this way. The float 119 floats up or sinks down in the volume-variable space 116 as indicated by a double-headed arrow in FIG. 2.

In the first gas-storage chamber 115, a partition-wall portion 121 is formed parallel to and away from the peripheral wall portion 114. In the first gas-storage chamber 115, a second gas-storage chamber 122 is formed of a part including the gas supply hole 117 among parts of the plate 113 and the partition-wall portion 121.

On the surface of the plate 113 through which the gas supply hole 117 is formed, there is provided a protruding seating portion 123 that forms an inflow space 124 through which the gas through the gas supply hole 117 can flow in under a state in which the float 119 is seated due to decrease in the buoyancy. In other words, as indicated by arrows in FIG. 2, the gas stored in the second gas-storage chamber 122 is supplied to the volume-variable space 116 through the gas supply hole 117 and the inflow space 124.

As described above, the fuel-tank control valve 1 controls opening and closing of a fuel flow path in the casing 111 by causing the float 119 to be seated on and unseated from the valve seat portion 112.

<Fuel-Tank Control Valve Including Main Float and Sub Float>

Figure 3:
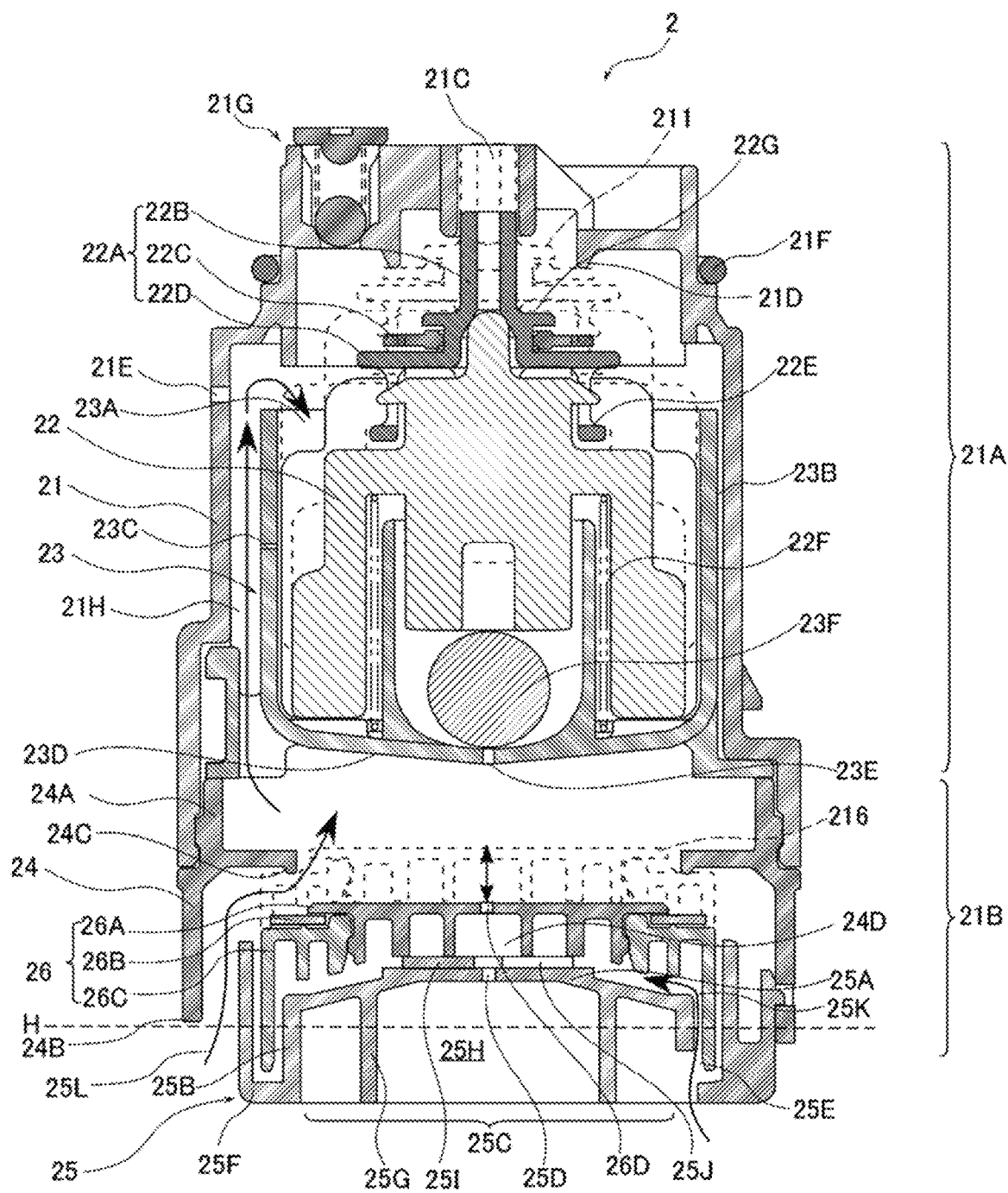
FIG. 3 is a cross-sectional side view of a fuel-tank control valve including a main float and a sub float.

FIG. 3 is a cross-sectional side view of a fuel-tank control valve 2 disclosed herein. Now, with reference to FIG. 3, a configuration and action of the fuel-tank control valve 2 are described.

The fuel-tank control valve 2 includes a casing 21, a main float 22 (corresponding to an upper float), a container body 23, a housing body 24, a plate 25, and a float. Hereinafter, this float is referred to as a sub float 26 as a counterpart of the main float 22.

The casing 21 includes a casing upper portion 21A and a casing lower portion 21B that is coupled to the housing body 24. In the fuel tank T described with reference to FIG. 1, the casing upper portion 21A is arranged at a position above an upper-limit liquid-surface level H at a time of fuel supply (what is called a full level). The casing 21 is a hollow cylindrical body. One end of the ventilation path V that establishes the communication between the fuel tank T and the canister C described with reference to FIG. 1 is connected to an upper end of the casing upper portion 21A (side where a ceiling surface of the fuel tank T is present).

The casing upper portion 21A is coupled to a flange (not shown), and installed in the fuel tank T. A gap between the casing upper portion 21A and the flange is sealed with an O-ring 21F. Among parts of a side surface of the casing upper portion 21A, a communication hole 21E is provided through a part below the O-ring 21F. The communication hole 21E establishes communication between an inside and an outside (inside of the fuel tank T) of the casing 21. The communication hole 21E allows the fuel F to be discharged to the outside of the casing upper portion 21A and the gas to be supplied to the inside of the casing upper portion 21A.

At the upper end of the casing upper portion 21A, a relief valve 21G is provided together with a guide portion 21C. The relief valve 21G opens when pressure in the fuel tank T exceeds a predetermined value, and discharges the evaporative gas in the fuel tank T to a side where the ventilation path V is present.

An upward flow path 21H is formed between the casing 21 and the container body 23. The fuel F that enters from the casing lower portion 21B passes through the upward flow path 21H in a direction indicated by an arrow in the illustration, and then is introduced into the container body 23.

The main float 22 is housed in a manner that allows the main float 22 to move in a direction in which the main float 22 floats up relative to the fuel F that has flowed into the container body 23 installed in the casing upper portion 21A, that is, in a manner that allows the main float 22 to move in an axial direction of the container body 23.

The main float 22 includes a holder 22A that has an inverted T-shape in cross section, and that is provided in an upper portion of the main float 22 through intermediation of a coupling mechanism 22E. In other words, the holder 22A includes a protruding portion 22B that protrudes in a direction to the guide portion 21C, and that can be inserted into the guide portion 21C, and a base portion 22D that can be seated on a main-float seating portion 21D below the protruding portion 22B. Under a state in which the base portion 22D is seated on the main-float seating portion 21D, the base portion 22D holds a sealing member 22C that seals a gap between the base portion 22D and the main-float seating portion 21D.

When the main float 22 floats up to cause the sealing member 22C to be seated on the main-float seating portion 21D, the sealing member 22C shuts a flow path 22G to bring the main float 22 into a closed state (state corresponding to a main-float closed position 211 indicated by dotted lines in FIG. 2). Meanwhile, when the main float 22 sinks down to cause the base portion 22D to be unseated from the main-float seating portion 21D, the sealing member 22C opens the flow path 22G. With this, the main float 22 enters an open state.

Note that, between the main float 22 and the container body 23, a spring 22F that biases the main float 22 in the closed direction so as to make up for buoyancy for the floating up is installed.

As described above, in conjunction with rise and fall of the liquid surface of the fuel F that enters the casing 21 from the casing lower portion 21B, the main float 22 opens and closes the flow path 22g in the casing 21 to which the ventilation path V is connected.

The container body 23 has a shape of a bottomed cup that houses the main float 22 in the casing upper portion 21A, that has an upper-end opening 23A which allows the main float 22 to move up and down, and that is capable of accumulating the fuel F. The upper-end opening 23A is located at substantially the same height as that of the communication hole 21E. The container body 23 is formed to introduce the fuel F to an inside of the container body 23 through the upper-end opening 23A when the fuel F reaches the upper-end opening 23A through the upward flow path 21H.

The container body 23 has a side-surface discharge hole 23C provided through a container-body side surface 23B, and a bottom-surface discharge hole 23E provided through a container-body bottom surface 23D. The side-surface discharge hole 23C allows the fuel F to be discharged to an outside of the container body 23 when the fuel F introduced through the upper-end opening 23A reaches a height of the side-surface discharge hole 23C. The container-body bottom surface 23D is formed into a shape of a funnel having a downward inclination toward the bottom-surface discharge hole 23E at a center of the container-body bottom surface 23D. The container body 23 has a sphere 23F that freely rolls on the container-body bottom surface 23D in the container body 23. The sphere 23F closes the bottom-surface discharge hole 23E in a stationary state, and rolls to open the bottom-surface discharge hole 23E in response to an impact. When the bottom-surface discharge hole 23E is opened by rolling of the sphere 23F, remainder of the fuel F at a position lower than the height of the side-surface discharge hole 23C is discharged to the outside of the container body 23.

As described above, the side-surface discharge hole 23C, the bottom-surface discharge hole 23E, and the sphere 23F provide discharge means for discharging the fuel F accumulated in the container body 23.

On both sides of the housing body 24, a housing-body upper end 24A that faces the container-body bottom surface 23D while being away therefrom to a side where the casing lower portion 21B is present, and a housing-body lower end 24B that allows entry of the fuel F are opened. The housing body 24 is engaged with the casing lower portion 21B with use of an engaging mechanism (snap-fit). With this, the housing body 24 forms the lower portion of the casing 21. The casing lower portion 21B and the housing body 24 need not necessarily be engaged with each other by the engaging mechanism as in the embodiments as long as the casing lower portion 21B and the housing body 24 are coupled to each other. Alternatively, the casing 21 and the housing body 24 may be molded integrally with each other into the casing 21 as a whole.

In the embodiments, a rim of the housing-body upper end 24A of the housing body 24 is formed into a protruding shape. With this, the housing body 24 constitutes the engaging mechanism. In addition, a valve seat portion 24C to be used when the sub float 26 described below is closed is formed from a lower side of the rim having the protruding shape toward an inside of the casing lower portion 21B. Note that, in a space between the housing-body upper end 24A (valve seat portion 24C) and the plate 25 described below, a volume-variable space 24D that is partitioned by the sub float 26 which freely moves up and down is formed.

The plate 25 is formed into an inverted cup shape as a whole in which a peripheral wall portion 25B is provided upright from a rim of an upper surface 25A to the casing lower portion 21B, that is, in a direction toward the upper-limit liquid-surface level H in the fuel tank T. A space formed of the upper surface 25A and the peripheral wall portion 25B serves as a first gas-storage chamber 25C. Note that, in the embodiments, a lower end in the upright direction of the peripheral wall portion 25B is folded back in a direction to an outside of the peripheral wall portion 25B. In this way, a fitting groove 25F having a U-shape in cross section is added.

In addition, the plate 25 has a clearance 25E that allows the fuel F in the fuel tank T to enter the housing body 24 (entry of the fuel F through a fuel entry path 25K indicated by an arrow in the illustration), and the upper surface 25A is arranged in an opening of the housing-body lower end 24B. In this way, the plate 25 constitutes a bottom portion of the casing lower portion 21B. In the embodiments, the housing-body lower end 24B and the upper surface 25A are coupled to each other with an engaging mechanism (snap-fit) similar to the coupling means for the casing lower portion 21B and the housing body 24. However, other coupling means may be employed.

The upper surface 25A has a gas supply hole 25D that allows gas in the first gas-storage chamber 25C to be supplied into the housing body 24 (sub float 26).

In the embodiments, a partition-wall portion 25G and a second gas-storage chamber 25H that are parallel to and away from a part including the gas supply hole 25D among parts of the plate 25 (upper surface 25A) and the peripheral wall portion 25B are provided in the first gas-storage chamber 25C. In addition, the clearance 25E is formed between the sub float 26 and the peripheral wall portion 25B.

The upper surface 25A includes seating portions 25I on which the sub float 26 is seated when the sub float 26 is opened, the seating portions 25I being provided on a side where the housing body 24 is present among sides of the upper surface 25A, that is, on a surface that faces the valve seat portion 24C. When the sub float 26 is seated on the seating portions 25I, an inflow space 25J that communicates with the gas supply hole 25D is formed between the upper surface 25A and the sub float 26.

Note that, although the plate 25 disclosed in FIG. 3 has a configuration including not only the partition-wall portion 25G and the second gas-storage chamber 25H but also the inflow space 25J as described above, the fuel-tank control valve 2 disclosed herein may have a configuration including any one of the inflow space 25J and a set of the partition-wall portion 25G and the second gas-storage chamber 25H as described below.

The sub float 26 is arranged between the housing-body upper end 24A and the upper surface 25A, and moves in conjunction with the rise and the fall of the liquid surface of the fuel F that enters through the clearance 25E and a fuel-entry path 25L. By partitioning the space between the housing-body upper end 24A and the plate 25 while freely moving up and down in this way, the sub float 26 forms the volume-variable space 24D.

In the embodiments, the sub float 26 includes a sub-float body 26A, a sub-float outer peripheral member 26C, and a sub-float sealing member 26B.

The sub-float body 26A forms a center of the sub float 26, and faces both the valve seat portion 24C of the housing-body upper end 24A and the seating portions 25I of the plate 25. A plurality of cells that temporarily store the gas are formed on a side where a surface that faces the seating portions 25I is present among sides of the sub-float body 26A. In the embodiments, these cells are formed by providing partition peripheral walls that form concentric circular spaces having different diameters on a flat member as a top plate of the sub-float body 26A. (In FIG. 2, a group of cells having a comb-teeth shape in cross section are formed.)

The sub-float outer peripheral member 26C is provided in an expanded manner to an outer rim of the sub-float body 26A. The sub-float outer peripheral member 26C has, at its center, a fit-insertion hole into which the sub-float body 26A is fitted. A protruding rim is formed along a rim portion of the fit-insertion hole. In the sub-float body 26A, a radially outermost one of the peripheral walls is formed on an inner side relative to a rim portion of the flat member, and the radially outermost one of the peripheral walls and the rim portion of the flat member cooperatively form a step portion having an inverted L-shape in cross section. The sub-float body 26A is fit-inserted into the fit-insertion hole of the sub-float outer peripheral member 26C. The rim portion of the flat member, the rim portion forming the step portion, is set onto the protruding rim of the sub-float outer peripheral member 26C, and is engaged by the engaging mechanism. By this setting, the protruding rim of the sub-float outer peripheral member 26C and the rim portion of the flat member of the sub-float body 26A form a peripheral groove. In addition, the sub-float outer peripheral member 26C jetties in a radial direction relative to the rim portion of the flat member while forming a step with a chamfered shoulder portion. The sub-float sealing member 26B fitted annularly in the peripheral groove is set onto the shoulder portion.

A surface that faces the upper surface 25A among surfaces of the sub-float outer peripheral member 26C provided in the expanded manner to the sub-float body 26A include cells that are formed as the cells in the sub-float body 26A are formed, and that are arrayed continuously with these cells in the sub-float body 26A. An outermost one of peripheral walls of the sub-float outer peripheral member 26C extends further downward than other ones of the peripheral walls that form the cells, and is annularly and loosely fitted into the fitting groove 25F and the clearance 25E of the plate 25.

The sub float 26 has a through-hole 26D that allows the gas which is stored on a side where the plate 25 is present, and which imparts buoyancy to the sub float 26 to be released to a side where the housing-body upper end 24A is present. In this way, the through-hole 26D allows the fuel F to be introduced from the side where the plate 25 is present. Thus, the through-hole 26D provides means for reducing the buoyancy of the sub float 26.

As the fuel F enters through the clearance 25E, the sub float 26 is floated up by the gas supplied from the first gas-storage chamber 25C to the volume-variable space 24D through the gas supply hole 25D. When the sub float 26 reaches and is seated on the valve seat portion 24C of the housing-body upper end 24A, the sub float 26 is closed to block the entry of the fuel F into the casing upper portion 21A (which is a state corresponding to a sub-float closed position 216 indicated by dotted lines in FIG. 3).

As the fuel F is discharged through the clearance 25E, the gas supplied from the volume-variable space 24D is discharged to the side where the housing-body upper end 24A is present through the through-hole 26D. As a result, the buoyancy is reduced, and the sub float 26 reaches and is seated on the seating portions 25I of the upper surface 25A. With this, the sub float 26 is opened to allow the entry of the fuel F into the casing upper portion 21A.

Now, operation of the fuel-tank control valve 2 during fuel supply is described. Before the fuel supply, both the main float 22 and the sub float 26 are in the closed state. When the fuel supply is started, and the liquid surface of the fuel F reaches the liquid-surface upper-limit level H, the liquid surface rapidly rises through the fuel-entry path 25L because the clearance 25E is formed of a narrow gap. As the liquid surface rises, the gas is supplied from the first gas-storage chamber 25C through the gas supply hole 25D. With this, the sub float 26 gains the buoyancy, and floats up in the volume-variable space 24D. When the sub float 26 reaches the valve seat portion 24C, the valve seat portion 24C is closed to enter a closed state. With this, the entry of the fuel F to the side where the casing upper portion 21A is present is hindered, and a first automatically-stopped state in which the fuel supply by a fuel supply apparatus (not shown) is stopped is achieved.

After that, when the gas is released through the communication hole 21E so that the pressure in the fuel tank T is released, the pressure decreases, and the liquid surface of the fuel F that has entered falls, and the sub float 26 sinks down in the volume-variable space 24D. When the sub float 26 reaches the seating portions 25I, the valve seat portion 24C is opened to enter an open state, and the gas is released also through the through-hole 26D to the side where the housing-body upper end 24A is present. When the sub float 26 is opened with the gas released through the through-hole 26D after being closed by the first automatic stopping, in this open state, the gas that imparts the buoyancy is absent. Thus, the sub float 26 does not operate.

When the fuel supply is continued even after the first automatic stopping, the liquid surface of the fuel F rises past the housing-body upper end 24A, and enters the upward flow path 21H. After that, the fuel F reaches the upper-end opening 23A, and flows into the container body 23. When the fuel F is accumulated in the container body 23, the main float 22 floats up to reach the main-float seating portion 21D. With this, the main float 22 enters the closed state, and internal pressure of the fuel-tank control valve 2 is retained for a predetermined time period. In this way, the fuel supply is disabled to prevent excess fuel supply.

The fuel F accumulated in the container body 23 is discharged through the side-surface discharge hole 23C. After a level of the fuel F in the container body 23 has become lower than the side-surface discharge hole 23C, the fuel F cannot be discharged through the side-surface discharge hole 23C. However, when a vehicle starts to travel, the sphere 23F in the container body 23 is caused to roll by wobbling along with the traveling. With this, the bottom-surface discharge hole 23E is opened to discharge the fuel F. In addition, as a result of the discharge of the fuel F from the container body 23, the main float 22 loses the buoyancy, and sinks down again to enter the open state.

Next, operation of a noise reduction mechanism for the fuel-tank control valve 2 is described. Negative pressure that is generated in a pulsating manner by repetitive engine purges is transmitted to the fuel tank T, which has influence also on the fuel-tank control valve 2. As a result, noise occurs when the sub float 26 collides against other members.

In the fuel-tank control valve 2 disclosed herein, the flow path of the clearance 25E that controls the buoyancy of the sub float 26 is formed to be narrow. With this, resistance is generated at the times when the fuel F flows into and out of the clearance 25E, and when the gas flows in and out. In other words, the clearance 25E causes a phase difference between a cycle of fluctuations of the pulsating negative pressure and a speed of the up-and-down movements of the sub float 26. This phase difference enables the sub float 26 to be controlled to slowly move despite the fluctuations of the pulsating negative pressure. With this, energy of the collision is reduced, and generation of the noise can be suppressed. The sub float 26 operates as a movable cylinder, and the plate 25 functions as a damper that operates as a fixed piston which moves relative to the movable cylinder.

Hereinbelow, embodiments of the fuel-tank control valve 2 disclosed herein among the embodiments are described. (Although the following embodiments are described using the plate 25 and the sub float 26 of the fuel-tank control valve 2, embodiments similar to these embodiments are applicable also to the plate 113 and the float 119 of the fuel-tank control valve 1.)

FIRST EMBODIMENT

Figure 4:
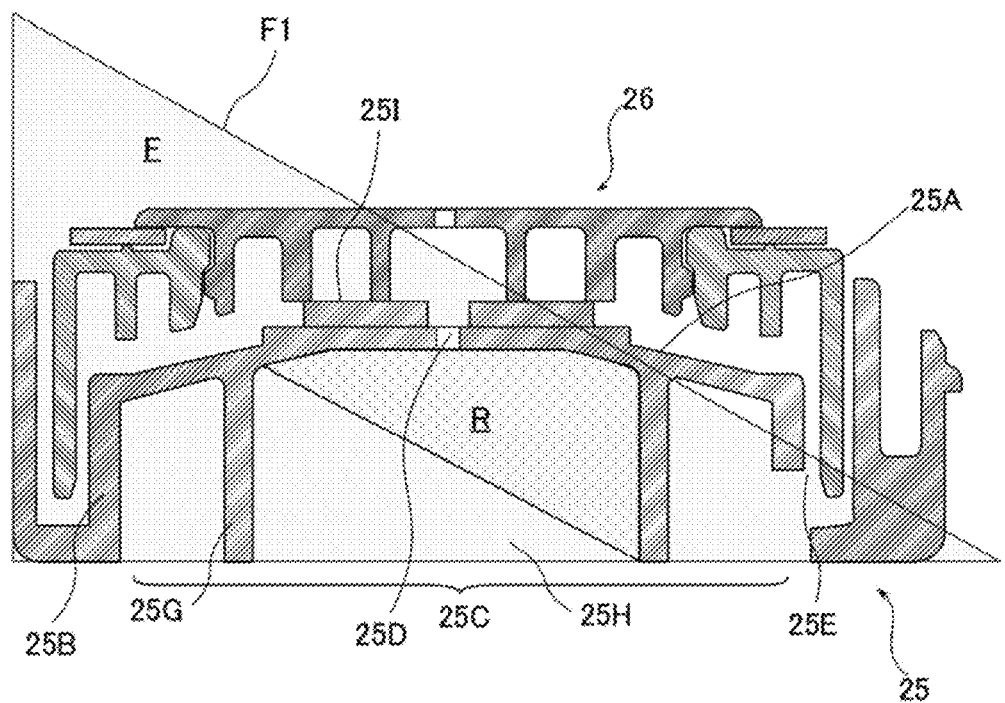
FIG. 4 is a schematic cross-sectional side view illustrating actions of a plate and a sub float of a fuel-tank control valve according to a first embodiment.

FIG. 4 is a schematic cross-sectional side view illustrating action of the plate 25 and the sub float 26 of the fuel-tank control valve 2 according to a first embodiment.

FIG. 4 illustrates a state in which the fuel F has precipitously entered the fuel-tank control valve 2 before the sub float 26 operates to close in a case where a vehicle in which the fuel-tank control valve 2 is installed turns (illustrates a state of the liquid surface in the case where the vehicle wobbles.)

Since the fuel F precipitously enters through the clearance 25E, the liquid surface F1 does not horizontally wobble relative to the plate 25 or the sub float 26. Then, a peak of the liquid surface F1 to wobble rises past the sub float 26, and the liquid surface F1 enters a side where the main float 22 is present. However, as described with reference to FIG. 3, since the sub float 26 has a structure of the damper, the sub float 26 moves slowly despite significant changes of the liquid surface F1. Thus, the sub float 26 does not immediately operate to close. Then, in a case where the vehicle successively turns, and a state in which the entry of the fuel F cannot be hindered continues with the sub float 26 remaining in the open state, the main float 22 is closed to increase the pressure in the fuel tank T. This poses a risk of deformation or damage.

At this time, although the fuel F enters also the first gas-storage chamber 25C, by the part including the gas supply hole 25D among the parts of the upper surface 25A of the plate 25, and by the partition-wall portion 25G, the residual gas R in the second gas-storage chamber 25H provided in the first gas-storage chamber 25C is retained in a space including the gas supply hole 25D. Thus, even when the fuel F rises past the sub float 26 and precipitously enters the side where the main float 22 is present, the residual gas R is supplied to the side where the sub float 26 is present through the gas supply hole 25D. Note that, the clearance 25E is formed on the outside of the second gas-storage chamber 25H.

The residual gas R supplied from the second gas-storage chamber 25H to the sub float 26 imparts the buoyancy to the sub float 26. Thus, in the case where the fuel F precipitously enters, the sub float 26 can be operated to close with good reactivity despite having the damper structure.

First Modification of First Embodiment

FIG. 5 is a view illustrating a first modification of the first embodiment. A of FIG. 5 is a bottom perspective view of the plate, and B of FIG. 5 is a schematic bottom view of the plate.

In the first modification of the first embodiment, a second gas-storage chamber 251H that is formed of a partition-wall portion 251G provided to the plate 25 is formed into a cylindrical shape. Depending, for example, on the successive turns of the vehicle, the fuel F rises and enters the fuel-tank control valve 2 in various directions. The wobbling of the fuel F due to the successive turns causes loss of the gas and the rise of the fuel F in all directions in the second gas-storage chamber 251H. Thus, in order that an amount of the gas to be lost and a rising speed of the fuel F is prevented from varying depending on the directions, an inner surface of the second gas-storage chamber 251H is preferred to be curved. For this reason, the second gas-storage chamber 251H to be regulated by the partition-wall portion 251G is formed into the cylindrical shape.

In addition, as illustrated in B of FIG. 5, a peripheral wall portion 251B is also formed into a cylindrical shape, and the gas supply hole 25D is provided at a center of an upper surface 251 A. In this way, a part constituting the second gas-storage chamber 251H among parts of the upper surface 251A is formed concentric with the upper surface 251A. With this, in the second gas-storage chamber 251H, radial distances from the partition-wall portion 251G to the gas supply hole 25D are equal to each other in all the directions. Thus, even in the case where the fuel F wobbles in the fuel tank T due to, for example, the successive turns, the amount of the gas to be lost in the second gas-storage chamber 251H is prevented from varying depending on directions of the wobbling of the fuel F due to, for example, the turns. The gas can be stably supplied to the sub float 26.

Second Modification of First Embodiment

In a second modification, as illustrated in FIG. 6, a second gas-storage chamber 252H is formed into an inverted tapered shape that is tapered from the part of the upper surface 25A to the side where the lower portion is present and where a partition-wall portion 252G is provided upright (side where the lower portion of the casing 21 that is not illustrated in FIG. 6 is present). By forming the second gas-storage chamber 252H into the inverted tapered shape, an area of an opening at a lower end that faces the upper surface 25A of the second gas-storage chamber 252H is reduced to prevent the gas from being released. In addition, volume near the gas supply hole 25D is relatively higher than volume near the opening at the lower end. Thus, the gas to be supplied to the sub float 26 is easily stored on the side where the gas supply hole 25D is present. Even when there is a risk of the above-described dynamic fuel spill, gas can be supplied to the sub float 26 with good reactivity.

Third Modification of First Embodiment

In a third modification, as illustrated in FIG. 7, the opening at the lower end of a partition-wall portion 253G, the lower end facing a part that forms a second gas-storage chamber 253H among the parts of the upper surface 25A, is bent into an L-shape in a direction to an interior space of the second gas-storage chamber 253H. By bending the lower end of the partition-wall portion 253G into the L-shape, an area of the opening at the lower end that faces the upper surface 25A of the second gas-storage chamber 252H is reduced. With this, even in the case where the fuel F wobbles in the fuel tank T due to, for example, the successive turns, the gas is easily secured in the second gas-storage chamber 252H, and the gas can be stably provided to the sub float 26.

Fourth Modification of First Embodiment

In a fourth modification, as illustrated in FIG. 8, an open end on the lower side of a partition-wall portion 254G is protruded to the lower side relative to the open end of the peripheral wall portion 25B. By protruding this lower end of the partition-wall portion 254G in this way, volume of a second gas-storage chamber 254H is increased. With this, the gas is easily secured in the second gas-storage chamber 254H, and the gas can be stably supplied to the sub float 26.

Fifth Modification of First Embodiment

In a fifth modification, as illustrated in FIG. 9, not only the gas supply hole 25D, but also a gas supply hole 251D and a gas supply hole 252D are provided at a part constituting the second gas-storage chamber 25H among the parts of the upper surface 25A. By providing the plurality of gas supply holes 25D, 251D, and 252D at the part constituting the second gas-storage chamber 25H among the parts of the upper surface 25A, even in such a case where an inclination angle has been steep due to, for example, the successive turns, the residual gas R in the second gas-storage chamber 25H can be supplied to the sub float 26 through any of the gas supply holes stably and with good reactivity.

SECOND EMBODIMENT

FIG. 10 is a view of the fuel-tank control valve 2 according to a second embodiment. A of FIG. 10 is a top perspective view of the plate, and B of FIG. 10 is a cross-sectional side view of the plate and the sub float.

The seating portions 25I of the upper surface 25A of the plate 25 are formed to protrude so that the inflow space 25J through which the gas through the gas supply hole 25D can flow in under the state in which the sub float 26 is seated is formed.

When the gas is supplied from the gas storage chamber 25C to the side where the sub float 26 is present through the gas supply hole 25D even under the state in which the sub float 26 is seated on the seating portions 25I of the plate 25, since the inflow space 25J is formed, the gas for floating up the sub float 26 can be promptly supplied as indicated by arrows in B of FIG. 10.

In addition, by the formation of the inflow space 25J, a contact area between the seating portions 25I and the sub float 26 is smaller than that in a case where the inflow space 25J is not formed. Thus, fuel surface tension to be caused by the surface contact between the sub float 26 and the seating portions 25I can be reduced. With this, even in the case where the vehicle successively turns to cause the fuel F to rise past the sub float 26 to precipitously enter the side where the main float 22 is present, the inflow space 25J enables the sub float 26 to float up and operate to close with good reactivity.

Now, modifications of the second embodiment are described with reference to FIG. 11.

First Modification of Second Embodiment

A of FIG. 11 is a schematic top view of seating portions 251I according to a first modification. In the first modification, a plurality of ribs are provided in a protruding manner as the seating portions 251I radially from the gas supply hole 25D into a direction to an outer periphery of the upper surface 25A, and a space between the ribs adjacent to each other is used as an inflow space 251J. There is no intention to limit the number of, heights of, and intervals between the ribs to those of three ribs that are equiangularly formed as the ribs in this modification.

Second Modification of Second Embodiment

B of FIG. 11 is a schematic top view of seating portions 252I according to a second modification. In the second modification, a plurality of slits that constitute inflow spaces 252J are provided radially from the gas supply hole 25D into the direction to the outer periphery of the upper surface 25A, and spaces between the slits adjacent to each other are used as the protruding seating portions 252I. There is no intention to limit the number of, heights of, and intervals between the slits to those of three slits that are equiangularly formed as the slits in this modification.

Third Modification of Second Embodiment

C of FIG. 11 is a schematic top view of seating portions 253I according to a third modification. In the third modification, a plurality of columnar protruding portions are provided upright as opening seating portions 253I from the upper surface 25A into a direction to the sub float 26, and a space between the columnar protruding portions is used as an inflow space 253J. There is no intention to limit the number of, heights of, and intervals between the columnar protruding portions to those of three columnar-protruding portions that are equiangularly provided upright as the columnar protruding portions in this modification.

THIRD EMBODIMENT

FIG. 12 is a schematic cross-sectional side view of the plate 25 and the sub float 26 according to a third embodiment. In this embodiment, the plate 25 includes the second gas-storage chamber 25H described in the first embodiment, and the protruding seating portions 25I that form the inflow space 25J described in the second embodiment. In other words, even when the fuel F is supposed to rise past the sub float 26 to precipitously enter the side where the main float 22 is present, first, the residual gas R in the second gas-storage chamber 25H can be supplied to the side where the sub float 26 is present through the gas supply hole 25D, and this supplied gas can be introduced into the inflow space 25J. With this, the sub float 26 can be promptly floated up. Thus, even when there is resistance against the closing operation by the damper structure in the case where the vehicle has entered the wobbling state, the sub float 26 can be operated to close with good reactivity, and the dynamic fuel spill can be prevented.

OTHER EMBODIMENTS

On the plate 25 according to the third embodiment, the plurality of ribs according to the first modification of the second embodiment may be provided in the protruding manner as the opening seating portions, and the space between the ribs adjacent to each other may be used as the inflow space. Alternatively, on the plate 25 according to the third embodiment, the plurality of slits according to the second modification of the second embodiment may be used as the inflow spaces, and the spaces between the slits adjacent to each other may be used as the protruding seating portions. Still alternatively, on the plate 25 according to the third embodiment, the plurality of columnar protruding portions may be provided upright as the seating portions, and the space between the columnar protruding portions may be used as the inflow space. Yet alternatively, the plates 25 according to the foregoing other embodiments may each include the second gas-storage chamber according to any of the first modification to the fourth modification of the first embodiment, or may each include the plurality of gas supply holes according to the fifth modification of the first embodiment.

The technology disclosed herein is not limited to the above-described embodiments. Specifically, the technology disclosed herein encompasses exemplified embodiments and modifications to be made on the basis of these embodiments by persons skilled in the art. Further, the technology disclosed herein encompasses combinations or replacements of components and elements between one of the embodiments and other ones of the embodiments. Still further, the disclosed technical scope is not limited to the description of the embodiments. The disclosed technical scope is defined by the description of the scope of claims, and encompasses meaning of equivalents of the elements described in the scope of claims and all changes within the scope of claims.

REFERENCE SIGNS LIST

T . . . Fuel tank
C . . . Canister
V . . . Ventilation path
1, 2 . . . Fuel-tank control valve
21, 111 . . . Casing
21A . . . Casing upper portion
21B . . . Casing lower portion
21C . . . Guide portion
22 . . . Main float
23 . . . Container body
24 . . . Housing body
24C, 112 . . . Valve seat portion
24D, 116 . . . Volume-variable space
25, 113 . . . Plate
25A . . . Upper surface
25B, 114 . . . Peripheral wall portion
25C, 115 . . . First gas-storage chamber
25D, 117 . . . Gas supply hole
25E, 118 . . . Clearance
25G, 121 . . . Partition-wall portion
25H, 122 . . . Second gas-storage chamber
25I . . . Seating portion
25J, 124 . . . Inflow space
25K, 25L . . . Fuel entry path
26 . . . Sub float
26D, 120 . . . Through-hole
119 . . . Float

The invention claimed is:

1. A fuel-tank control valve comprising:
a casing
that is installed in a fuel tank for a vehicle, and
that includes an upper portion connected to a ventilation path which communicates with the fuel tank;
a valve seat portion that is provided in the casing;
a plate that is arranged to face the valve seat portion on a side where a lower portion of the casing is present relative to the valve seat portion;
a peripheral wall portion that is provided upright from a rim of the plate to the side where the lower portion of the casing is present;
a first gas-storage chamber that is formed of the plate and the peripheral wall portion;
a gas supply hole
that is opened through a top surface of the plate which faces the valve seat portion, the gas supply hole being smaller in size than a bottom opening of the plate, and
that allows gas to be supplied from the first gas-storage chamber into a volume-variable space which is formed between the plate and the valve seat portion;
a clearance
which is formed between the casing and the peripheral wall portion, and
through which fuel in the fuel tank can flow in;
a float
that has buoyancy against the fuel which flows in through the clearance, and
that is provided to be capable of being seated on the valve seat portion by floating up in the volume-variable space by replenishment of the gas to be supplied through the gas supply hole;
a through-hole
that is opened through the float,
that causes the fuel to be suppressed from flowing in through the clearance under a state in which the float is seated on the valve seat portion, and
that allows the gas which has been supplied in the volume-variable space to be discharged to a side where the upper portion is present relative to the valve seat portion as the buoyancy decreases; and
a second gas-storage chamber
that is formed of
a part including the gas supply hole among parts of the plate, and
a partition-wall portion which is provided upright parallel to and away from the peripheral wall portion, and
that is provided in the first gas-storage chamber,
the fuel-tank control valve controlling opening and closing of a fuel flow path in the casing by causing the float to be seated on and unseated from the valve seat portion.

2. The fuel-tank control valve according to claim 1, wherein the second gas-storage chamber is formed into a cylindrical shape that is formed of
an upper surface which is formed of the part including the gas supply hole among the parts of the plate, and
a side surface which is formed of the partition-wall portion.

3. The fuel-tank control valve according to claim 2, wherein the first gas-storage chamber is concentrically formed
by being formed into a cylindrical shape that is formed of
an upper surface which is formed of the plate, and
the side surface which is formed of the partition-wall portion, and
by providing the gas supply hole at a center
of the upper surface of the plate, and
of the upper surface which is formed of the part including the gas supply hole among the parts of the plate.

4. The fuel-tank control valve according to claim 1, wherein the partition-wall portion is formed into an inverted tapered shape from the part including the gas supply hole among the parts of the plate to the side where the lower portion of the casing is present.

5. The fuel-tank control valve according to claim 1, wherein a side where an open end is present among sides of the partition-wall portion is bent into an L-shape in a direction to an interior space of the second gas-storage chamber.

6. The fuel-tank control valve according to claim 1, wherein an open end of the partition-wall portion protrudes to the side where the lower portion of the casing is present.

7. The fuel-tank control valve according to claim 1, wherein the gas supply hole includes gas supply holes that are provided at two or more positions in the part including the gas supply hole among the parts of the plate.

8. The fuel-tank control valve according to claim 1, wherein an upper surface of the plate includes a protruding seating portion that forms an inflow space through which the gas through the gas supply hole can flow in under a state in which the float is seated on the protruding seating portion.

9. The fuel-tank control valve according to claim 8, wherein the protruding seating portion includes a plurality of ribs that are provided in a protruding manner radially from the gas supply hole into a direction to an outer periphery of the upper surface, and
wherein a space between the plurality of ribs adjacent to each other forms the inflow space.

10. The fuel-tank control valve according to claim 8, wherein the protruding seating portion includes a plurality of slits, the plurality of slits each constituting the inflow space radially from the gas supply hole into a direction to an outer periphery of the upper surface, and
wherein spaces between the plurality of slits adjacent to each other each form the protruding seating portion.

11. The fuel-tank control valve according to claim 8, wherein the protruding seating portion includes a plurality of columnar protruding portions that are provided upright from the upper surface into a direction to the float, and
wherein a space between the plurality of columnar protruding portions forms the inflow space.

12. The fuel-tank control valve according to claim 1, further comprising:
an upper float for preventing excess fuel supply; and
an upper valve-seat portion,
wherein the upper float and the upper valve-seat portion are provided on a top side relative to the valve seat portion.

13. A fuel-tank control valve comprising:
a casing that is connected to a fuel tank for a vehicle;
a valve seat portion that is provided in the casing;
a plate that is arranged to face the valve seat portion on a side where a lower portion of the casing is present relative to the valve seat portion;
a peripheral wall portion that is provided upright from a rim of the plate to the side where the lower portion of the casing is present;
a gas storage chamber that is formed of the plate and the peripheral wall portion;
a gas supply hole
that is opened through a surface which faces the valve seat portion among surfaces of the plate, and
that allows gas to be supplied from the gas storage chamber into a volume-variable space which is formed between the plate and the valve seat portion;
a clearance
which is formed between the casing and the peripheral wall portion, and
through which fuel in the fuel tank can flow in;
a float
that has buoyancy against the fuel which flows in through the clearance, and
that is provided to be capable of being seated on the valve seat portion by floating up in the volume-variable space by replenishment of the gas to be supplied through the gas supply hole;
a through-hole
that is opened through the float,
that causes the fuel to be suppressed from flowing in through the clearance under a state in which the float is seated on the valve seat portion, and
that allows the gas which has been supplied in the volume-variable space to be discharged to a side where an upper portion of the casing is present relative to the valve seat portion as the buoyancy decreases; and
a protruding seating portion that forms an inflow space through which the gas through the gas supply hole can flow in under a state in which the float is seated on the protruding seating portion due to the decrease of the buoyancy, the inflow space being formed on the surface through which the gas supply hole is opened among the surfaces of the plate,
the fuel-tank control valve controlling opening and closing of a fuel flow path in the casing by causing the float to be seated on and unseated from the valve seat portion.

14. The fuel-tank control valve according to claim 13, wherein the protruding seating portion includes a plurality of ribs that are provided in a protruding manner radially from the gas supply hole into a direction to an outer periphery of the plate, and
wherein a space between the plurality of ribs adjacent to each other forms the inflow space.

15. The fuel-tank control valve according to claim 13, wherein the protruding seating portion includes a plurality of slits, the plurality of slits each constituting the inflow space radially from the gas supply hole into a direction to an outer periphery of the plate, and
wherein spaces between the plurality of slits adjacent to each other each form the protruding seating portion.

16. The fuel-tank control valve according to claim 13, wherein the protruding seating portion includes a plurality of columnar protruding portions that are provided upright from the plate into a direction to the float, and
wherein a space between the plurality of columnar protruding portions forms the inflow space.

17. The fuel-tank control valve according to claim 13, further comprising:
an upper float for preventing excess fuel supply; and
an upper valve-seat portion,
wherein the upper float and the upper valve-seat portion are provided on the side where the upper portion of the casing is present relative to the valve seat portion.

* * * * *